Figure 1:
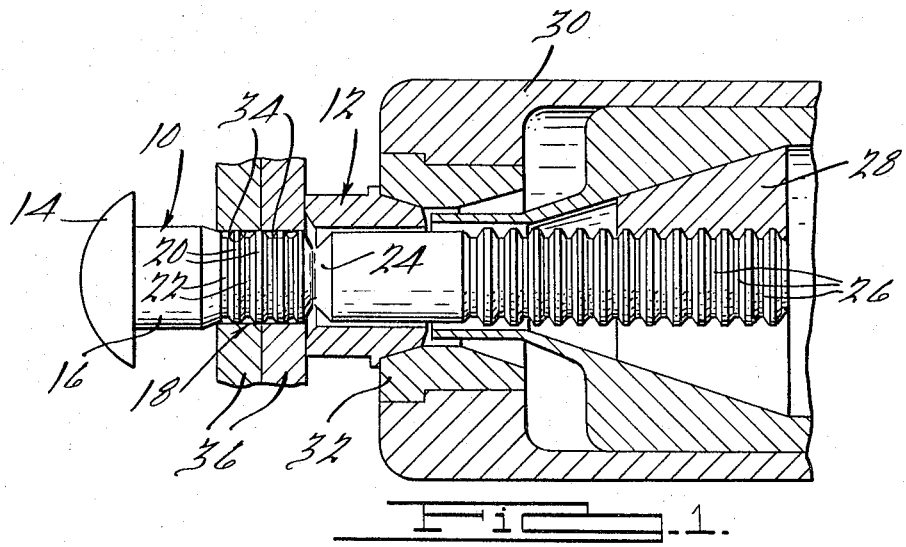

Jan. 24, 1967   C. J. KASZA ETAL   3,300,347
FASTENING DEVICE AND METHOD OF MAKING SAME
Filed May 7, 1964

INVENTORS.
Carl J. Kasza
Walter J. Smith
BY
Harness, Dickey & Pierce
ATTORNEYS 3,300,347
FASTENING DEVICE AND METHOD OF
MAKING SAME
Carl J. Kasza, Livonia, and Walter J. Smith, Dearborn,
Mich., assignors to Huck Manufacturing Company, Detroit, Mich., a corporation of Michigan
Filed May 7, 1964, Ser. No. 365,735
4 Claims. (Cl. 148—12.3)

The present invention broadly relates to parts made from precipitation-hardening steel alloys which, in the solution-annealed condition, are subjected to a variable degree of cold work so that some regions show a substantially greater amount of deformation than do other regions of the same part. Specifically, it relates to fastener devices and more particularly to an improved fastener made of a precipitation-hardening stainless steel alloy which has been subjected to a controlled heat treatment to produce more uniform, higher strength properties with a significant reduction in heat treatment time.

Fastening devices of the type to which the present invention is applicable comprise a two-part assembly including a pin or bolt provided with a preformed head and wherein the shank portion thereof is adapted to be inserted from one side of the work and a collar is thereafter positioned over the shank at the opposite side of the work and securely clinched to the shank. A fastening device of this general type is disclosed in U.S. Patent No. 2,531,049 granted November 21, 1950, and assigned to the same assignee of the present invention. The fastening device as disclosed in the aforementioned patent is conventionally employed for securing a plurality of plates or panel members together formed with aligned openings therethrough and through which the pin or bolt extends. The preformed head on the pin is adapted to engage the outside surface of one of the panels and the collar is adapted to engage the outside surface of the opposite panel. The fastener is conventionally set by pulling the pin and applying a reaction force to the collar whereby during the initial or primary clinching operation the panels are pulled tightly together with free relative motion between the pin and collar.

As the pulling force is increased, a point is reached where the collar is locked to the pin by flowing metal from the collar into locking grooves provided around the periphery of the shank of the pin. An interference fit between the periphery of the pin and the collar as well as the clamping of the sheets or panels into tight contact must be accomplished during the primary clinch phase, that is, before the motion of an anvil of the pull tool for applying the tensile and reactive force has caused sufficient swaging to bring the internal diameter of the collar into engagement with the locking lands which define a plurality of longitudinally spaced locking grooves around the periphery of the pin. At the end of the primary clinch phase at which point the collar has been swaged into initial contact with the pin, relative free movement between the pin and collar stops and thereafter a secondary clinch phase commences becoming progressively greater as the swaging of the collar into the locking grooves continues.

A "break-neck" groove is provided along the shank of the pin which is of a controlled depth so as to effect a tensile break of the pin at the completion of the secondary clinching phase at which point the collar has become tightly swaged in the locking grooves. The strength of a joint thus formed is predicated principally on the strength of the engaging relationship between the swaged collar and the locking grooves on the shank of the pin.

Fastening devices of the foregoing general type are in widespread commercial use for securely joining a variety of materials for use under a variety of different operating conditions. An increasing demand has occurred for fastening devices of this type which are of high strength and retain their physical characteristics to a high degree while subjected to elevated temperatures in a range of about 1000° F. to as high as about 1300° F. as is frequently encountered in various components of high performance engines. While various stainless steel alloys have heretofore been used or proposed for use for components subjected to such elevated temperatures during operation, none of the alloys heretofore known with or without selected heat treatment has provided a fastening device of the type comprising the present invention which is of economical manufacture and use and possesses high strength which is consistent and uniform from lot to lot.

A further problem has been the lack of uniformity in the "break-neck" strength of the pin or bolt comprising the fastening device at the relief groove therearound resulting in variations in the pulling force applied at the completion of the secondary clinching phase such that variations occur in the clamping force applied to the panels joined in addition to variations in the effective locking engagement between the collar and the locking grooves. Not only is the ultimate tensile strength of the joint influenced by the variations in the degree of clinching provided but moreover an impairment in the shear strength of the locking grooves engaged by the swaged collar has occasioned variations in the strength of the resultant joint.

It is accordingly a principal object of the present invention to provide an improved fastening device of a corrosion and heat-resistant alloy and an improved process of making such a fastening device including the use of a precipitation-hardening stainless steel alloy of controlled composition which at the completion of the fabrication of the fastener is subjected to a controlled heat-treating cycle effecting a stabilization of the physical strength characteristics of the fastener providing thereby greater uniformity in its break-neck strength and an increase in the shear strength of its locking grooves resulting in a substantial improvement in the strength of the joint.

Another object of the present invention is to provide an improved fastening device and an improved process for making the fastening device including a controlled heat-treating cycle which is simpler, less time consuming, which requires less rigorous control, and which forms a fastener having more uniform properties such that the fastener and the joint formed thereby consistently attains a higher strength level with a smaller degree of variation than fastening devices of similar type heretofore known.

The foregoing and other objects and advantages of the present invention are achieved by employing a ductile precipitation hardenable austenitic chromium-nickel-titanium ferrous alloy of a controlled composition which is cold headed and rolled to form a pin or bolt portion and can also be employed for forming the collar portion of the fastener. The fastener components are thereafter subjected to a controlled heat-treating cycle effecting an aging of the alloy and optimising its physical strength properties. The controlled heat-treating cycle to which the fastener is subjected comprises a heating of the fastener to a temperature of from about 1050° F. to about 1150° F. for a period of from about 1 up to about 7 hours and thereafter subjecting the fastener to a second heat-treatment at a temperature of from about 1275° F. to about 1325° F. for a period of from about 2 hours up to about 4 hours followed thereafter by an air cooling to room temperature. The combination of the alloy employed and the controlled two-step heat-treating cycle provides a fastener having improved high temperature characteristics in comparison to fastening devices of similar type heretofore known. The relatively short duration of the heat treatment cycle enables the use of an air atmosphere in the heat-treating furnace as opposed to vacuum or inert gas atmospheres such as argon, for example, which are conventionally employed during prolonged heat-treating cycles of stainless steel alloys of similar type. The relatively short duration of the heat-treatment cycle also provides for a substantial reduction in the total heat-treatment time thus providing for a substantial increase in the capacity of the heat-treating furnace and a greater efficiency and utilization of equipment in comparison to heat-treating cycles of the types conventionally employed for precipitation-hardening stainless steel alloys.

Figure 2:
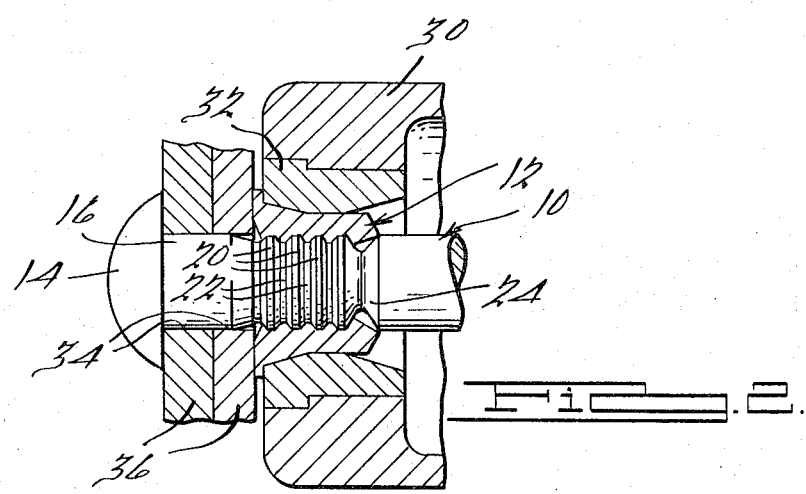
Figure 3:
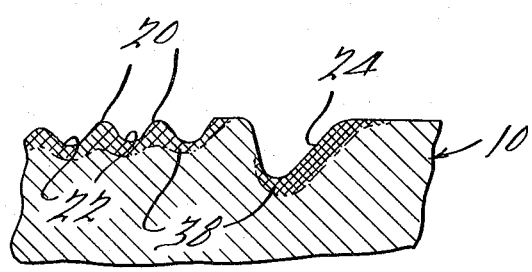

Other objects and advantages of the present invention will become apparent upon a reading of the following description taken in conjunction with the drawings in which:

FIGURE 1 is a cross-sectional view illustrating a fastener of the type comprising the present invention disposed through a pair of plates or panels to be joined at the initiation of the primary clinching phase;

FIGURE 2 is a fragmentary cross-sectional view similar to that shown in FIGURE 1 illustrating the relationship of the pin or bolt and the swaged collar therearound during the secondary clinching phase but prior to the final breaking of the pin; and FIGURE 3 is an enlarged fragmentary longitudinal sectional view through the pin illustrating the stress concentrations at the locking lands and at the break-neck groove of the pin.

The improved fastening device and the simplified process for making the fastening device is achieved by employing a stainless steel alloy which is broadly categorized as an austenitic chromium-nickel-titanium steel having a composition as follows:

Table I

| Constituent: | Percent by weight |
|---|---|
| Carbon | 0.15 max. |
| Manganese | 0.5 to 3.0. |
| Silicon | Up to 1.5. |
| Chromium | About 5 to about 22. |
| Nickel | 7 to 50. |
| Titanium | 0.5 to 3.5. |
| Molybdenum | 0.25 to 4.0. |
| Vanadium | 0.1 to 1.5. |
| Tungsten | Up to 4.0. |
| Cobalt | Up to 25.0. |
| Columbium plus tantalum | Up to 1.0. |
| Aluminum | Up to 2.5. |
| Boron | Up to 0.06. |
| Impurities (nitrogen, phosphorus, sulfur, etc.) | Up to about .1. |
| Iron | Balance. |

The use of cobalt, tungsten, columbium, and tantalum in the alloy as set forth in the foregoing table is not a necessary requisite and is employed for providing an increase in the strength of the fastening device when required. A preferred composition of the alloy for use in fastening devices which has been found to be eminently satisfactory for most uses is as follows:

Table II

| Constituent: | Percent by weight |
|---|---|
| Carbon | Max. 0.08 |
| Manganese | 1 to 2. |
| Silicon | Max. 1. |
| Chromium | 13.5 to 16.0. |
| Nickel | 24 to 27. |
| Molybdenum | 1 to 1.5. |
| Titanium | 1.75 to 2.35. |
| Vanadium | 0.10 to 0.50. |
| Aluminum | Max. 0.35. |
| Boron | 0.001 to 0.010. |
| Sulfur | Max. 0.04. |
| Phosphorus | Max. 0.04. |
| Iron | Balance. |

The alloy as set forth in Tables I and II can be conveniently formed into rods which are employed in conventional cold-heading and rolling operations for forming a bolt or pin having a configuration corresponding in general to the pin indicated at 10 in FIGURE 1. Similarly, the alloy can be extruded forming a collar of the general shape illustrated in FIGURE 1 at 12. It will be understood that the collar 12 may also be comprised of alloys other than the alloy as set forth in Tables I and II of which the pin 10 is comprised providing it is of suffiicent ductility to permit swaging during the clinching of the fastener and possesses the requisite strength and corrosion resistance. Any one of a variety of forging and rolling techniques well known in the art can be satisfactorily employed for imparting a configuration to the pin and collar of the general type as illustrated in FIGURE 1. The pin 10 as shown in FIGURE 1 comprises a head portion 14 which is integrally affixed to a shank portion including a cylindrical portion 16 and a grooved portion or section 18 comprising a plurality of circular lands 20 disposed in spaced longitudinal relationship forming a plurality of intervening locking grooves indicated at 22.

Adjacent to the end of the groove portion 18, the shank of the pin 10 is formed with an annular V-shaped breakneck groove 24 which is adapted to rupture at the completion of the secondary clinching phase. The remaining shank portion of the pin 10 may be provided with suitable grooves or threads 26 to facilitate a gripping of the pin by jaws 28 of a conventional pull-type tool including a barrel or sleeve 30 formed at its forward end with an anvil 32 adapted to be disposed in abutting relationship against the end of the collar 12.

The diameter of the cylindrical portion 16 is slightly greater than the outer diameter of the lands 20 to facilitate insertion of the pin 10 through a pair of aligned holes 34 in a pair of panels 36 to be fastened together. The cylindrical portion 16 is preferably of a diameter slightly greater than the diameter of the holes 34 but the holes 34 should be of a size sufficient to enable free passage of the groove portion 18 of the pin providing an initial assembly of the several components in a manner as illustrated in FIGURE 1 prior to the initiation of the primary clinching phase.

During the initiation of the primary clinching phase, the pin 10 is pulled toward the right as viewed in FIGURE 1 by the jaws 28. This movement is resisted by the sleeve 30 and the anvil 32 disposed against the collar 12 whereupon the cylindrical portion 16 of the pin is drawn inwardly into the aligned holes 34 with the shoulder of the head portion 14 disposed in firm clamping relationship against the outside surface of the panel 36. As the pulling force of the jaws increases, the collar 12 commences to swage inwardly and in locking engagement in the locking grooves 22 as shown in FIGURE 2 which continues until a pulling force is obtained sufficient to break or snap the pin 10 at the break-neck groove 24. Upon a rupture of the pin at the break-neck groove, the pullgun assembly including the jaws and the sleeve 30 are removed leaving the fastener in clamping engagement against opposite surfaces of the panel 36. It will be appreciated that the strength of the joint will be determined by the tensile strength of the pin at the root portions of the locking grooves 22 as well as by the shear strength of the lands 20 and of the metal of the collar which has been swaged into locking engagement therewith.

It will be understood that a fastener of the type shown in the drawings comprising the pin 10 and the collar 12 can be simply formed of the desired size and configuration by conventional cold-forming techniques due to the excellent ductility of the stainless steel alloy. During the course of the cold-forming operation, the components of the fastener and particularly the lands 20 forming the locking grooves 22 along the grooved section 18 of the pin as well as the metal adjacent to the break-neck groove 24 become cold-worked and incorporate stress gradients in the cold-worked portions thereof. The resultant pin is thereafter subjected to a controlled heat-treating operation in accordance with the practice of the present invention whereby a stress relief of the cold-worked areas as well as a certain degree of aging, is achieved effecting a conditioning of the alloy followed by a second heat-treating step wherein the alloy is further aged attaining optimum physical strength characteristics.

The first heat-treating cycle comprises a heating of the fastener pin to a temperature of from about 1050 to about 1150° F. and preferably from about 1075° F. to about 1125° F. for a period of from about one hour up to about seven hours. Temperatures below about 1050° F. during the first heat-treating phase have been found to provide insufficient stress relief and conditioning of the alloy to prevent an overaging thereof during the subsequent heat-treating step. Temperatures, on the other hand, above about 1150° F. have been found to promote an overaging of the alloy resulting in a reduction in its physical strength properties. In view of the foregoing, the first heat-treating step is controlled within a temperature of from 1050° F. to about 1150° F. and preferably at about 1100° F. In addition to careful control of temperature during the first heat-treating step, the time is controlled at a minimum of about one hour. The time is established by that period at which the fastener has attained a temperature within the range hereinabove set forth. Time periods of less than about one hour have been found to provide inadequate stress relief and conditioning of the alloy to prevent overaging in the usbsequent heat-treating step. On the other hand, it has been found that heat treatment times during the first heat-treating step in excess of one hour do not appreciably affect the properties of the fastener and while heat-treating times up to about seven hours can be employed, no appreciable benefit is obtained. Accordingly, the use of heat-treatment times substantially in excess of about one hour is commercially undesirable. The fact, however, that treating times in excess of one hour do not appreciably affect the properties of the alloy, provides a distinct advantage in the versatility of the process comprising the present invention avoiding complex control systems which are frequently necessary during the heat treatment of alloys having critical temperature-time relationship.

At the completion of the first heat-treating step, the conditioned alloy can be further heated in the same furnace to a temperature ranging from about 1275° F. to about 1325° F. corresponding to the range of the second heat treatment step, or alternatively can be cooled or transferred to a second furnace while still hot for heating to within the aforementioned range. In either event the second heat treating step is carried out at a temperature within the aforementioned range and for a period of time of at least about two hours which may continue up to about four hours. Heat treating times of less than about two hours during the second heat treating step have been found to provide inadequate precipitation hardening of the alloy resulting in the attainment of physical strength properties less than optimum. On the other hand heat treating times in excess of about four hours have been found not to provide any additional benefits in the physical properties of the alloy beyond that obtained after about two hours and accordingly such longer treating times constitute a commercially uneconomical procedure.

Due to the relatively short duration of heat treatment in both the initial and secondary heat treatment phases, heat treating furnaces employing conventional air atmospheres can be satisfactorily employed in comparison to vacuum or inert gas atmospheres such as argon, for example, which is conventionally necessary when heat treating stainless steel alloys for substantially longer times. The ability to use an air atmosphere in accordance with the practice of the present invention in lieu of a vacuum or inert gas atmosphere constitutes still another advantage in the economy and simplicity of the process comprising the present invention. Due to the use of an air atmosphere during the first and second heat treating phases, subjection of the alloy fastener components to treating times in substantial excess of about one hour during the first phase and in substantial excess of about two hours during the second phase promotes the formation of oxidation scale on the surfaces of the fastener without any significant improvement in the physical strength properties of the resultant fastening device. It is accordingly preferred from both the standpoint of efficient utilization of the heat treating furnaces and to minimize the formation of scale on the surfaces of the fastener to effect heat treatment within the prescribed temperature ranges employing time periods not substantially in excess of the minimum time periods of one hour for the first heat treatment phase and two hours for the second heat treatment phase as hereinbefore set forth.

FIGURE 3 comprises a microphotograph of a longitudinally sectioned fastener pin mounted in a phenol-formaldehyde resin and metallurgically polished and chemically etched to accentuate the stresses present adjacent to the locking grooves 22 and the break-neck groove 24 resulting from a cold heading and rolling of the pin and thereafter subjecting it to a recommended heat treatment in accordance with the prior practice of sixteen hours at about 1350° F. The criss cross hatched areas indicated at 38 result in an overaging of the material when exposed to elevated temperatures during use effecting further precipitation hardening beyond the optimum resulting in a decrease in the strength of the lands 20 whereupon they are sheared off when subjected to a shear stress resulting in failure of the fastener. In comparison a fastening pin made in accordance with the process comprising the present invention shows a substantially smaller criss cross hatched area 38 as shown in FIGURE 3 resulting from a stress relief and conditioning of the alloy of which the pin is comprised, preventing overaging during the second cycle of the heat treatment and accordingly producing consistently high physical strength properties.

In order to further illustrate the improved strength of the fasteners comprising the present invention over fasteners of similar types heretofore known, comparison tests were made of cold-headed and cold-rolled pins of the type illustrated in FIGURES 1 and 2 comprised of an alloy of a composition as set forth in Table II. One quantity of the pins was heat-treated in accordance with conventional practice at a temperature of about 1325° F. for a period of sixteen hours in a furnace provided with an inert gas atmosphere. A second quantity of the fastener pins was heat-treated in accordance with the process comprising the present invention in a first heat-treating cycle at a temperature of 1100° F. for a period of one hour and in a second heat-treating cycle at 1300° F. for a period of two hours. The fasteners were subsequently employed for fastening together a pair of panels and the ultimate tensile strength of the joint formed was determined by evaluating the force necessary to push out the pin from the collar as a result of the shear rupture of the locking lands around the pin into which the collar was swaged. Such tests revealed that fasteners made in accordance with the sixteen hour heat treatment at 1325° F. had a joint strength or pushout force ranging from as low as 1680 pounds up to 2160 pounds. In comparison, the fasteners made in accordance with the present invention had a pushout force ranging from 2500 pounds up to 2620 pounds, or an average joint strength of more than about 30% greater than that obtained on the other fasteners. In addition to the improved strength of the joint, the fastener and the method of forming the fastener in accordance with the present invention provided for a substantially more uniform pull force to effect a pin breakage in comparison to that obtained on the other pins.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. A method of making a temperature and corrosion resistant fastening device which comprises the steps of providing a metal blank of a stainless-steel alloy having a composition expressed in terms of percentages by weight as follows—

| Constituent: | Percent by weight |
|---|---|
| Carbon | Max. 0.15 |
| Manganese | 0.5 to 3.0 |
| Silicon | Up to 1.5 |
| Chrominum | About 5 to about 22 |
| Nickel | 7 to 50 |
| Titanium | 0.5 to 3.5 |
| Molybdenum | 0.25 to 4.0 |
| Vanadium | 0.1 to 1.5 |
| Tungsten | Up to 4.0 |
| Cobalt | Up to 25.0 |
| Columbium plus tantalum | Up to 1.0 |
| Aluminum | Up to 2.5 |
| Boron | Up to 0.06 |
| Impurities (nitrogen, phosphorus, sulfur, etc.) | Up to about .1 |
| Iron | Balance | cold forming said blank into a pin comprising a head portion and a shank portion formed with a plurality of longitudinally spaced grooves therearound and a breakneck groove having a greater depth than the first-mentioned said grooves, heat treating said pin at a temperature of about 1050° F. to about 1150° F. for a period of at least about one hour up to about 7 hours and thereafter heat treating said pin at a temperature of about 1275° F. to about 1325° F. for a period of at least about two hours up to about four hours, and cooling said pin.

2. A method of making a temperature and corrosion resistant fastening device which comprises the steps of providing a metal blank of a stainless-steel alloy having a composition expressed in terms of percentages by weight as follows—

| Constituent: | Percent by weight |
|---|---|
| Carbon | Max. 0.08 |
| Manganese | 1 to 2 |
| Silicon | Max. 1 |
| Chrominum | 13.5 to 16.0 |
| Nickel | 24 to 27 |
| Molybdenum | 1 to 1.5 |
| Titanium | 1.75 to 2.35 |
| Vanadium | 0.10 to 0.50 |
| Aluminum | Max. 0.35 |
| Boron | 0.001 to 0.010 |
| Sulfur | Max. 0.04 |
| Phosphorus | Max. 0.04 |
| Iron | Balance | cold forming said blank into a pin comprising a head portion and a shank portion formed with a plurality of longitudinally spaced grooves therearound and a breakneck groove having a greater depth than the first-mentioned said grooves, heat treating said pin at a temperature of about 1075° F. to about 1125° F. for a period of a least about one hour up to about seven hours and thereafter heat treating said pin at a temperature of about 1275° F. to about 1325° F. for a period of at least about two hours up to about four hours, and cooling said pin.

3. A method of making a temperature and corrosion resistant fastening device which comprises the steps of providing a blank of a stainless-steel alloy having a composition expressed in terms of percentages by weight as follows—

| Constituent: | Percent by weight |
|---|---|
| Carbon | Max. 0.08 |
| Manganese | 1 to 2 |
| Silicon | Max. 1 |
| Chrominum | 13.5 to 16.0 |
| Nickel | 24 to 27 |
| Molybdenum | 1 to 1.5 |
| Titanium | 1.75 to 2.35 |
| Vanadium | 0.10 to 0.50 |
| Aluminum | Max. 0.35 |
| Boron | 0.001 to 0.010 |
| Sulfur | Max. 0.04 |
| Phosphorus | Max. 0.04 |
| Iron | Balance | cold forming said blank into a pin comprising a head portion and a shank portion formed with a plurality of longitudinally spaced grooves therearound and a breakneck groove having a depth greater than the depth of said first-mentioned groove, heat treating said pin at a temperature of about 1100° F. for a period of about one hour in an air atmosphere and thereafter heat treating said pin at a temperature of about 1300° F. for a period of about two hours in an air atmosphere, and thereafter cooling said pin.

4. A fastener made in accordance with the process as set forth in claim 1.

References Cited by the Examiner

UNITED STATES PATENTS 2,957,790 10/1960 Metcalfe _____ 148—12.3
3,199,978 8/1965 Brown et al. _____ 148—142

HYLAND BIZOT, *Primary Examiner.*

DAVID L. RECK, H. F. SAITO, *Assistant Examiners.*